/ United States Patent / Horii

(10) Patent No.: US 12,385,218 B2
(45) Date of Patent: Aug. 12, 2025

(54) WORKING MACHINE

(71) Applicant: KUBOTA CORPORATION, Osaka (JP)

(72) Inventor: Hiroshi Horii, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 396 days.

(21) Appl. No.: 18/077,736

(22) Filed: Dec. 8, 2022

(65) Prior Publication Data
US 2023/0117431 A1  Apr. 20, 2023

Related U.S. Application Data

(63) Continuation of application No. PCT/JP2021/047012, filed on Dec. 20, 2021.

(30) Foreign Application Priority Data

Jan. 27, 2021  (JP) .................. 2021-011441

(51) Int. Cl.
*E02F 9/20*     (2006.01)
*B60K 26/02*    (2006.01)
*E02F 9/16*     (2006.01)
*G05G 1/01*     (2008.04)
(Continued)

(52) U.S. Cl.
CPC ............ *E02F 9/2004* (2013.01); *B60K 26/02* (2013.01); *E02F 9/16* (2013.01); *G05G 1/01* (2013.01); *G05G 1/445* (2013.01); *G05G 1/483* (2013.01)

(58) Field of Classification Search
CPC ..... B60K 26/02; B60K 2026/026; E02F 9/16; E02F 9/20; E02F 9/2004; G05G 1/30; G05G 1/445; G05G 1/48
(Continued)

(56) References Cited

U.S. PATENT DOCUMENTS 1,826,968 A * 10/1931 Townsend ............... G05G 1/30
                                                 74/513
3,715,934 A *  2/1973 Reed .................. B60K 26/02
                                                 29/453
(Continued)

FOREIGN PATENT DOCUMENTS

CN    107097642 A    8/2017
CN    109983417 A    7/2019
(Continued)

OTHER PUBLICATIONS

International Search Report issued in International Patent Application No. PCT/JP2021/047012, dated Mar. 1, 2022, along with an English translation thereof.
(Continued)

*Primary Examiner* — Jason S Daniels
(74) *Attorney, Agent, or Firm* — GREENBLUM AND BERNSTEIN, P.L.C.

(57) ABSTRACT

A working machine includes: an operator's seat; and at least one pedal to be operated by being stepped on with a foot, or with feet. The at least one pedal is disposed ahead of the operator's seat. The at least one pedal includes a pedal body extending in a predetermined direction, a pedal shaft having an axis intersecting the predetermined direction and supporting the pedal body in such a way as to allow pivotal motion of the pedal body around the axis, and a tread surface provided on an upper surface of the pedal body and being a surface on which an operator places the foot. The tread surface is sloped such that a height from the pedal body decreases gradually from a portion closer to a big toe of the foot of the operator placed thereon toward a portion closer to a little toe.

9 Claims, 10 Drawing Sheets

(51) Int. Cl.
*G05G 1/445* (2008.04)
*G05G 1/483* (2008.04)

(58) Field of Classification Search
USPC ........................................ 296/190.01, 190.08
See application file for complete search history.

(56) References Cited

U.S. PATENT DOCUMENTS

| | | | | |
|---|---|---|---|---|
| 8,469,138 | B1* | 6/2013 | Koehler | B60K 26/02 |
| | | | | 74/513 |
| 9,798,351 | B2* | 10/2017 | Takahashi | G05G 1/483 |
| 10,036,136 | B2* | 7/2018 | Higuchi | E02F 3/325 |
| 2015/0233092 | A1* | 8/2015 | Fujikawa | B62D 33/0617 |
| | | | | 296/190.08 |
| 2017/0240044 | A1 | 8/2017 | Tabata et al. | |
| 2019/0338493 | A1 | 11/2019 | Horii | |

FOREIGN PATENT DOCUMENTS

| | | |
|---|---|---|
| CN | 211200535 | 8/2020 |
| EP | 4 209 860 A1 | 7/2023 |
| JP | H0702559 | 1/1995 |
| JP | 2000129726 | 5/2000 |
| JP | 2016097691 | 5/2016 |
| JP | 2019019572 | 2/2019 |
| JP | 2020050253 | 4/2020 |
| KR | 20090059187 | 6/2009 |

OTHER PUBLICATIONS

Office Action, dated Jun. 20, 2025, issued in Chinese family member Appl. No. 202180036239.2 along with an English translation thereof.

* cited by examiner

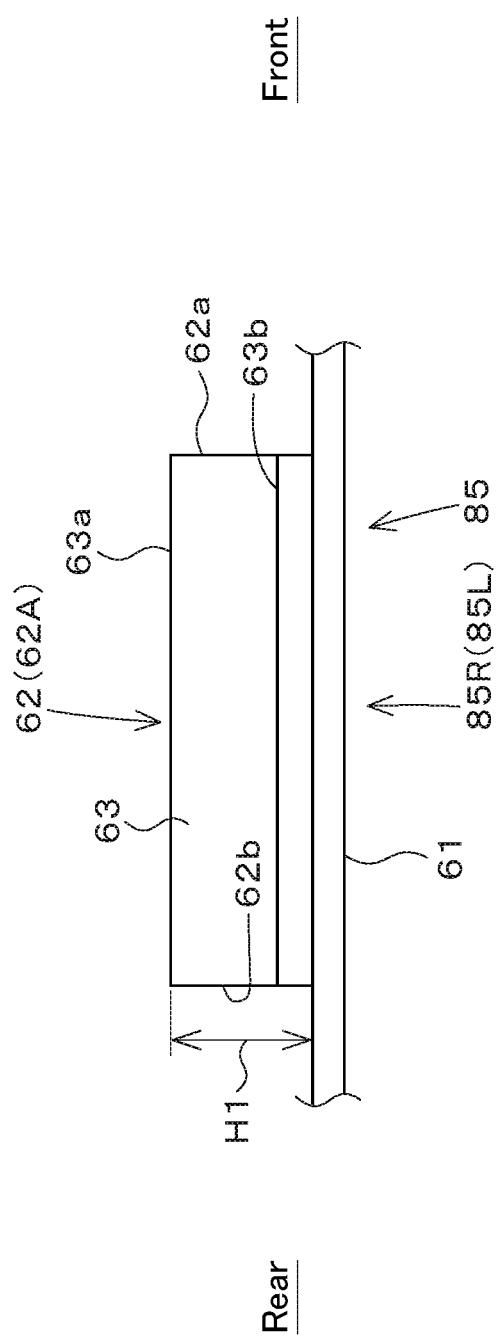

WORKING MACHINE

CROSS REFERENCE TO RELATED APPLICATIONS

This application is a continuation application of International Application No. PCT/JP2021/047012, filed on Dec. 20, 2021, which claims the benefit of priority to Japanese Patent Application No. 2021-011441, filed on Jan. 27, 2021. The entire contents of this application are hereby incorporated herein by reference.

BACKGROUND OF THE INVENTION

1. Field of the Invention

The present invention relates to a working machine such as a backhoe.

2. Description of the Related Art

A working machine disclosed in Japanese Unexamined Patent Application Publication No. 2019-019572 is known in the art.

The working machine disclosed in Japanese Unexamined Patent Application Publication No. 2019-019572 includes left and right traveling pedals making up a pair and operable for manipulating a traveling device by being stepped on with operator's feet.

SUMMARY OF THE INVENTION

A tread surface that is an upper surface of a traveling pedal in the art is a flat surface formed in parallel with an axis of a pedal shaft. Therefore, when the operator places the sole of the foot on the tread surface, foot motion is not smooth, and the operator tends to get tired.

In light of the above problem, the present invention aims to provide a working machine that makes it possible to perform smooth pedal operation.

A working machine according to an aspect of the present invention includes: an operator's seat; and at least one pedal to be operated by being stepped on with a foot, or with feet, the at least one pedal being disposed ahead of the operator's seat. The at least one pedal includes a pedal body extending in a predetermined direction, a pedal shaft having an axis intersecting the predetermined direction and supporting the pedal body in such a way as to allow pivotal motion of the pedal body around the axis, and a tread surface provided on an upper surface of the pedal body and being a surface on which an operator places the foot. The tread surface is sloped such that a height from the pedal body decreases gradually from a portion closer to a big toe of the foot of the operator placed thereon toward a portion closer to a little toe.

The pedal shaft may extend in a machine-body width direction. The pedal shaft may be disposed at an intermediate position in the direction in which the pedal body extends. The pedal shaft may support the pedal body in such a way as to allow the pivotal motion of the pedal body.

The at least one pedal may include a tread member provided closer to toes of the foot of the operator placed thereon than the pedal shaft on the upper surface of the pedal body. The tread surface may be formed as an upper surface of the tread member.

The working machine may include, as the at least one pedal, a pair of pedals arranged at a distance from each other.

The distance between the pair of pedals may become greater gradually toward the toes of the feet of the operator placed thereon.

Going from the portion closer to the big toe of the foot of the operator placed thereon toward the portion closer to the little toe, the tread member may be skewed in an orientation of coming closer to the pedal shaft in a plan view.

The working machine may further include: a traveling device. The at least one pedal may be at least one traveling pedal for manipulating the traveling device.

The upper surface of the pedal body may be a planar surface that is in parallel with the direction in which the pedal body extends. The tread surface may be sloped such that the height from the upper surface of the pedal body decreases gradually from the portion closer to the big toe of the foot of the operator placed thereon toward the portion closer to the little toe.

The working machine may further include: a manipulator base disposed in front of the operator's seat; a manipulation member to be gripped and operated, the manipulation member being provided on the manipulator base; and an armrest extending rearward from the manipulator base. The at least one pedal may be disposed at a position where the at least one pedal is operable by the operator in a posture of leaning an upper part of a body forward and gripping the manipulation member, with an elbow rested on the armrest.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 10 is a view taken along the line J2-J2 of FIG. 8.

DETAILED DESCRIPTION OF THE PREFERRED EMBODIMENTS

Figure 1:
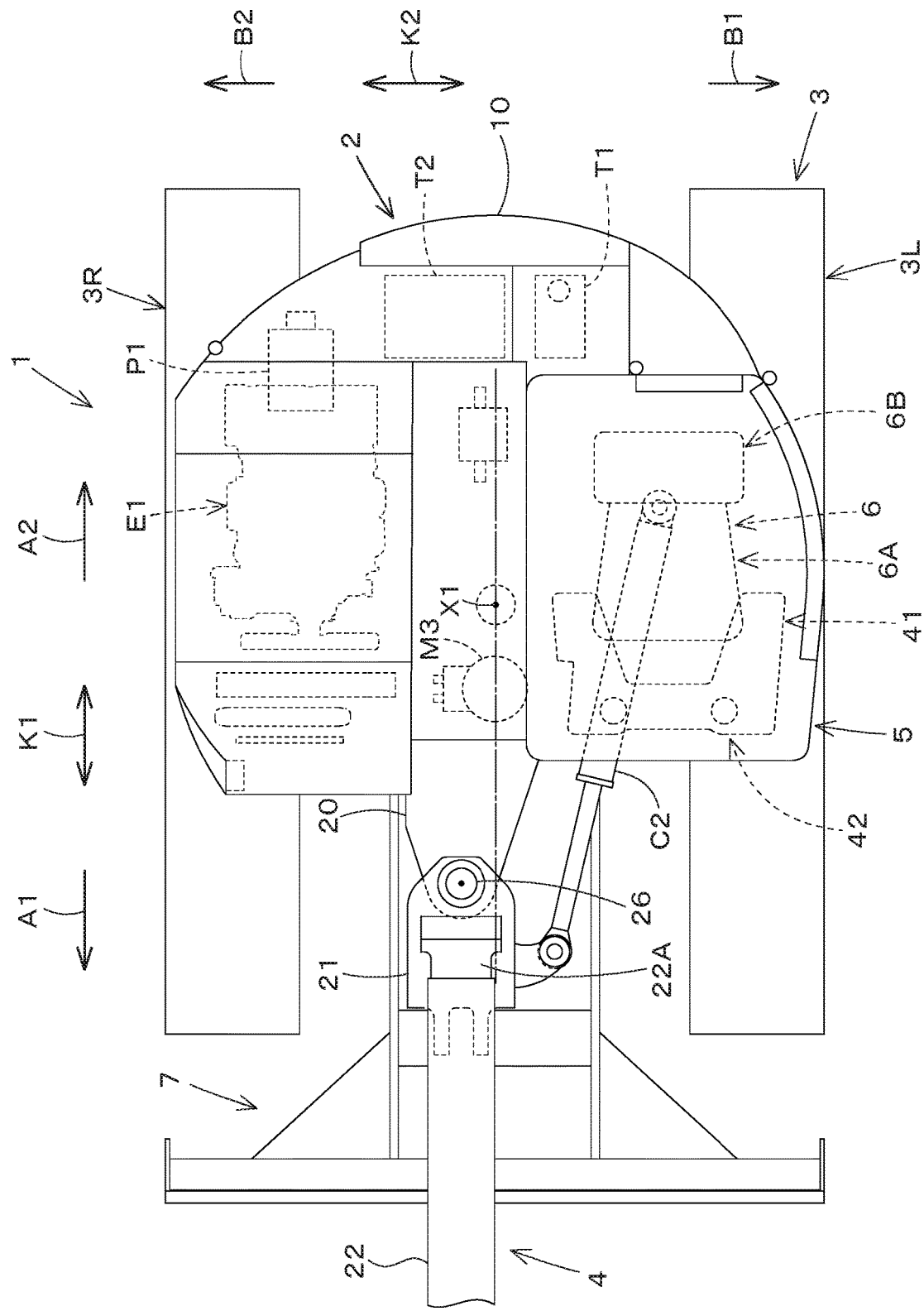
FIG. 1 is a plan view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

A certain embodiment of the present invention will now be described while referring to the drawings, where necessary.

Figure 2:
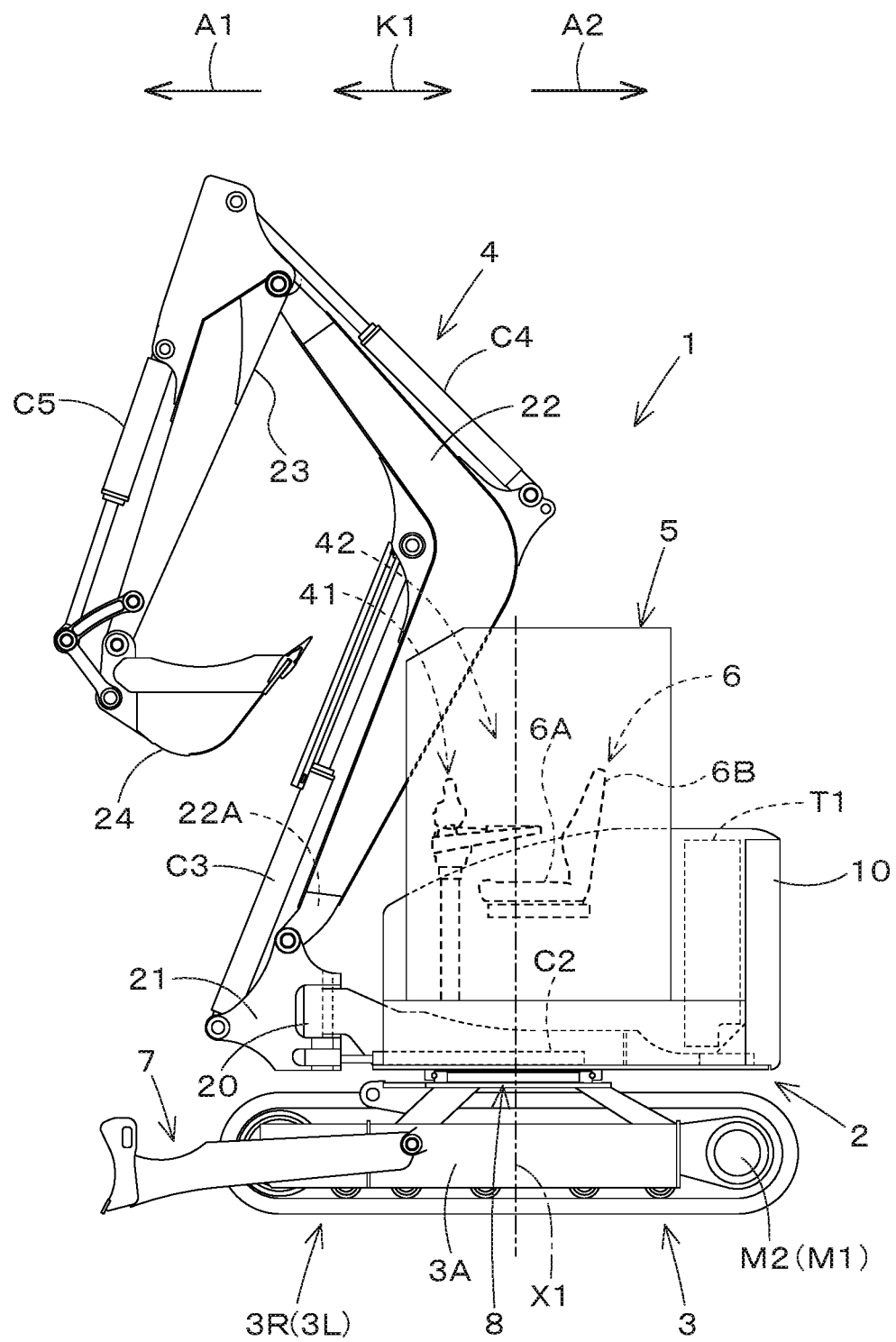
FIG. 2 is a side view of a working machine.

FIG. 1 is a schematic plan view illustrating the overall structure of a working machine 1 according to the present embodiment. FIG. 2 is a schematic side view of the working machine 1. In the present embodiment, a backhoe, which is a swiveling working machine, will be taken as an example of the working machine 1.

As illustrated in FIGS. 1 and 2, the working machine 1 includes a machine body (swivel base) 2, a traveling device 3, and a working device 4. A cabin 5 is mounted on the machine body 2. An operator's seat 6, on which an operator sits, is provided inside the cabin 5. In other words, the operator's seat 6 is mounted on the machine body 2, and the cabin 5 encloses the operator's seat 6. The operator's seat 6 includes a seat portion 6A, which is a portion where the operator sits, and a backrest portion 6B, which is a portion for supporting the back of the operator.

In the present embodiment, the term "forward", etc. will be used for referring to a direction going forward with respect to the operator sitting on the operator's seat 6 of the working machine 1 (direction indicated by an arrow A1 in FIGS. 1 and 2), the term "rearward", etc. will be used for referring to a direction going rearward with respect to the operator (direction indicated by an arrow A2 in FIGS. 1 and 2), the term "leftward", etc. will be used for referring to a direction going leftward with respect to the operator (direction indicated by an arrow B1 in FIG. 1), the term "rightward", etc. will be used for referring to a direction going rightward with respect to the operator (direction indicated by an arrow B2 in FIG. 1), and the direction indicated by an arrow K1 in FIGS. 1 and 2 will be referred to as "front-rear direction".

As illustrated in FIG. 1, a horizontal direction orthogonal to the front-rear direction K1 will be referred to as "machine-body width direction" K2 (width direction of the machine body 2).

As illustrated in FIGS. 1 and 2, the traveling device 3 is a crawler-type device that supports the machine body 2 in such a way as to make it travelable. The traveling device 3 includes a traveling frame 3A, a first traveling device 3L provided on the left side of the traveling frame 3A and a second traveling device 3R provided on the right side of the traveling frame 3A. The first traveling device 3L is driven by a first traveling motor M1. The second traveling device 3R is driven by a second traveling motor M2. A dozer device 7 is mounted on the front portion of the traveling device 3. The traveling device 3 is not limited to a crawler-type traveling device. For example, the traveling device 3 may be a wheeled-type traveling device.

As illustrated in FIG. 2, the machine body 2 is supported via a swivel bearing 8 on the traveling frame 3A such that the machine body 2 can swivel around a swivel axis X1. The machine body 2 is driven to swivel by a swiveling motor M3. A fuel tank T1, a hydraulic fluid tank T2, and a weight 10 are mounted on the rear portion of the machine body 2.

As illustrated in FIG. 1, the cabin 5 is mounted at one side (left side) on the machine body 2 in the machine-body width direction K2. A prime mover E is mounted at the other side (right side) on the machine body 2 in the machine-body width direction K2. The prime mover E1 is a diesel engine. The prime mover E1 may be a gasoline engine. Alternatively, the prime mover E1 may be a hybrid-type device that includes an engine and an electric motor. A hydraulic pump P1 is attached to the rear portion of the prime mover E1.

As illustrated in FIGS. 1 and 2, a swing bracket 21 is mounted via a swing shaft 26 on the front portion of a support bracket 20 in such a way as to be able to perform pivotal motion around a vertical axis. The working device 4 is attached to the swing bracket 21.

As illustrated in FIG. 2, the working device 4 includes a boom 22, an arm 23, and a bucket (working tool) 24. A proximal portion 22A of the boom 22 is pivotally attached to the top of the swing bracket 21 by a boom pivot 27 in such a way as to be able to rotate freely around a horizontal axis (an axis extending in the machine-body width direction K2).

The arm 23 is pivotally attached to a distal end of the boom 22 in such a way as to be able to rotate freely around a horizontal axis. The bucket 24 is provided on a distal end of the arm 23 in such a way as to be able to perform shoveling operation and dumping operation. The shoveling operation is operation of moving the bucket 24 closer to the boom 22 pivotally. For example, the shoveling operation is performed when scooping earth and sand or the like. The dumping operation is operation of moving the bucket 24 away from the boom 22 pivotally. For example, the dumping operation is performed when letting the scooped earth and sand or the like fall (when discharging it from the bucket).

In addition to or in place of the bucket 24, other kind of working tool (hydraulic attachment) that can be driven by a hydraulic actuator can be attached to the working machine 1. Some examples of such other kind of working tool are: a hydraulic breaker, a hydraulic crusher, an angle broom, an earth auger, a pallet fork, a sweeper, a mower, and a snow blower.

The swing bracket 21 is capable of moving pivotally by extending-and-retracting motion of a swing cylinder C2 provided on the machine body 2. The boom 22 is capable of moving pivotally by extending-and-retracting motion of a boom cylinder C3. The arm 23 is capable of moving pivotally by extending-and-retracting motion of an arm cylinder C4. The bucket 24 is capable of performing shoveling operation and dumping operation by extending-and-retracting motion of a bucket cylinder (working tool cylinder) C5. The swing cylinder C2, the boom cylinder C3, the arm cylinder C4, and the bucket cylinder C5 are hydraulic cylinders.

Figure 3:
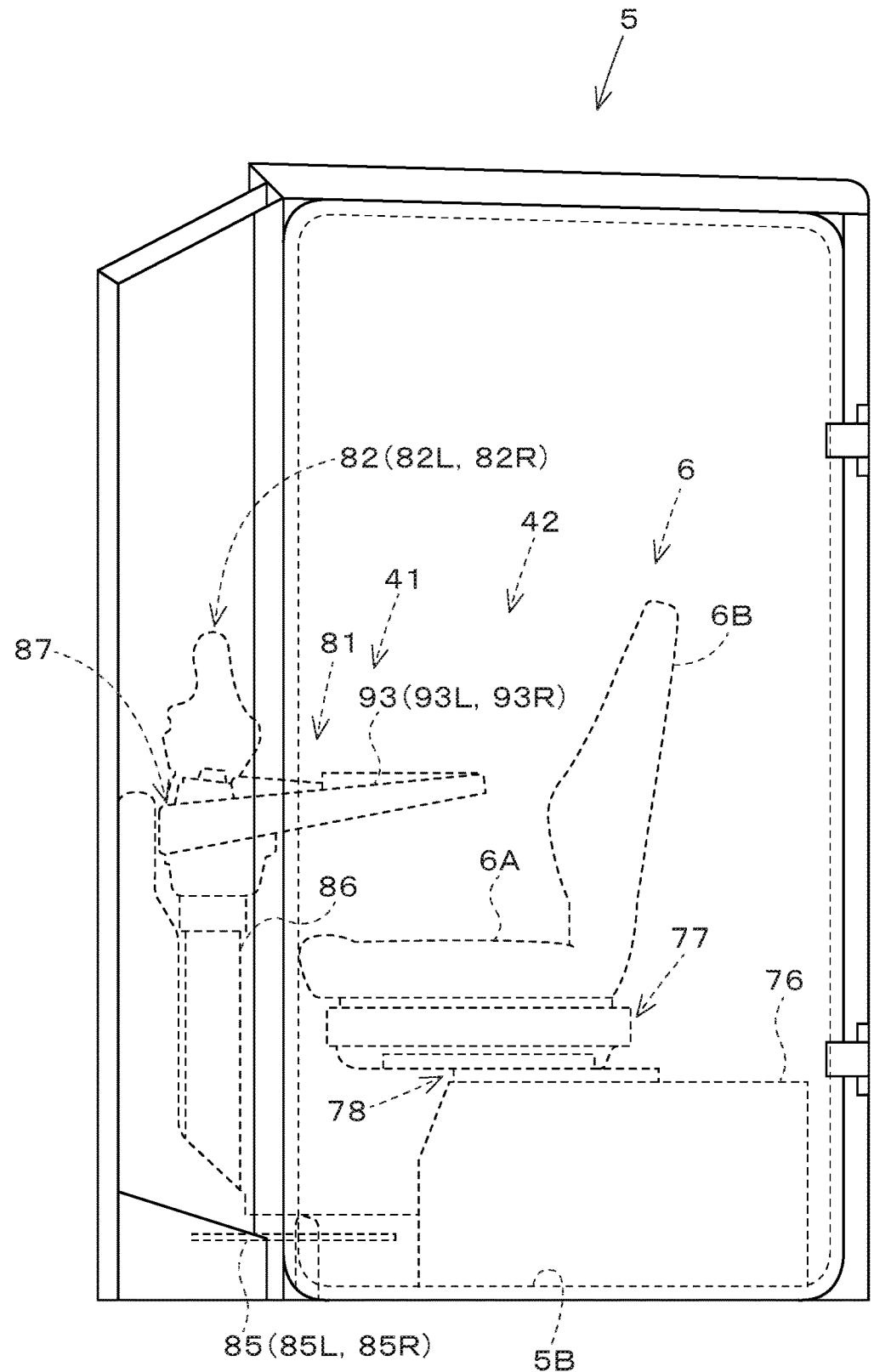
FIG. 3 is a side view of a cabin.

As illustrated in FIGS. 1 and 3, a manipulator 41 is provided inside the cabin 5. The manipulator 41 is provided in front of the operator's seat 6. The operator's seat 6 and the manipulator 41 constitute an operator's station 42 for operating the working machine 1 (for manipulating the machine body 2, the traveling device 3, the working device 4, the swing bracket 21, and the like).

Figure 4:
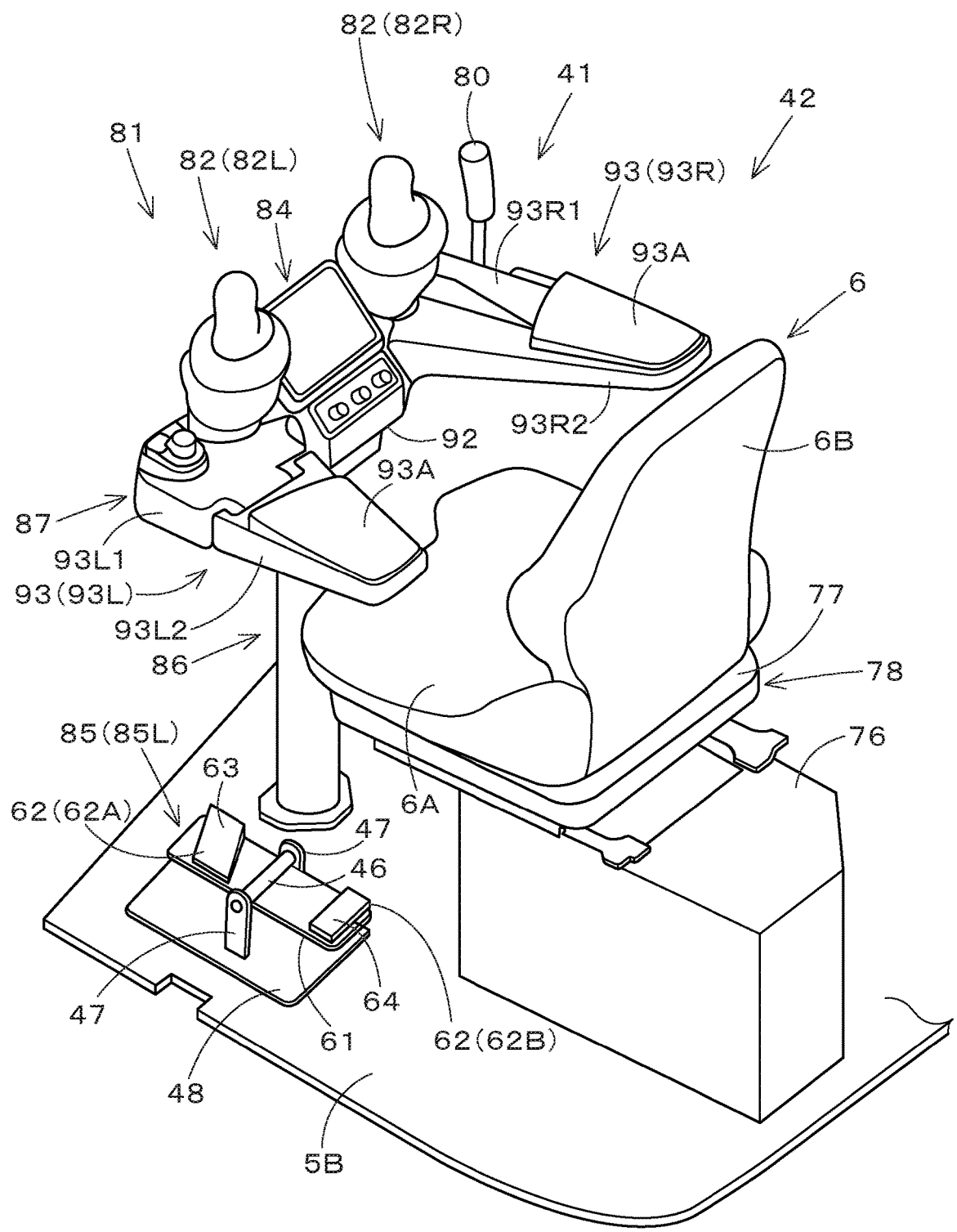
FIG. 4 is a perspective view of an operator's station.

As illustrated in FIGS. 3 and 4, the operator's seat 6 is supported by means of a seat pedestal 76 and the like over a floor 5B, which is the bottom portion of the cabin 5. A suspension device 77 is provided on the seat pedestal 76. The operator's seat 6 is provided on the suspension device 77 in such a manner that its position can be adjusted forward and rearward along slide rails 78.

As illustrated in FIGS. 3 and 4, the manipulator 41 includes a manipulator base 81, a manipulation member 82, a monitor 84, a dozer lever 80, and left and right traveling pedals (pedals) 85 making up a pair.

The manipulator base 81 is provided on the machine body 2 in front of the operator's seat 6. The manipulator base 81 includes a base column 86, which is provided in such a way as to rise from the floor 5B (the machine body 2), and a manipulator base body 87, which is disposed on the top of the base column 86. The manipulation member 82 is a member configured to be gripped and operated by the operator. The manipulation member 82 is mounted on the manipulator base body 87 (the manipulator base 81). The manipulation member 82 includes a first manipulation handle 82L and a second manipulation handle 82R, which are provided side by side in the machine-body width direction K2. The operator is able to perform manipulation for, for example, swiveling motion of the machine body 2, pivotal motion of the boom 22, pivotal motion of the arm 23, and pivotal motion of the bucket 24 by operating the first manipulation handle 82L and the second manipulation handle 82R.

As illustrated in FIG. 4, the manipulator base body 87 includes an attachment portion 92, which is a center portion in the machine-body width direction K2, and armrests 93, which are provided to the left and right of the attachment portion 92. The attachment portion 92 is detachably attached to the base column 86. The armrest 93 located to the left of the attachment portion 92 will be referred to as a first armrest 93L. The armrest 93 located to the right of the attachment portion 92 will be referred to as a second armrest 93R.

The first armrest 93L includes an armrest base portion 93L1, which is provided on the left side of the attachment portion 92, and an armrest body 93L2, which is pivotally supported behind the armrest base portion 93L1. The second armrest 93R includes an armrest base portion 93R1, which is provided on the right side of the attachment portion 92, and an armrest body 93R2, which is formed integrally with the armrest base portion 93R1.

The armrest body 93L2 extends rearward (toward the operator's seat 6) from the armrest base portion 93L1. Similarly, the armrest body 93R2 extends rearward (toward the operator's seat 6) from the armrest base portion 93R1. That is, the armrests 93 are provided on the manipulator base 81 and extend toward the operator's seat 6 from the manipulator base 81.

As illustrated in FIG. 3, the lower surface of the armrests 93 (the first armrest 93L and the second armrest 93R) is sloped up rearward. This structure makes the space under the armrests 93 wider toward the operator's seat 6. The operator's station 42 according to the present embodiment is designed such that the left thigh of the operator will be positioned under the first armrest 93L and the right thigh of the operator will be positioned under the second armrest 93R. Sloping up the lower surface of the armrests 93 rearward makes the leg space of the operator wider.

As illustrated in FIG. 4, each of the armrest body 93L2 and the armrest body 93R2 has, at its rear portion, an elbow support portion 93A where the operator can rest the elbow. The elbow support portion 93A is made of a material having cushioning property. The manipulation member 82 is operated by the operator in a posture of leaning the upper part of the body forward and gripping the manipulation member 82, with the elbows rested on the armrests 93. More specifically, the operator rests the left elbow on the elbow support portion 93A of the first armrest 93L and grips the first manipulation handle 82L with the left hand and rests the right elbow on the elbow support portion 93A of the second armrest 93R and grips the second manipulation handle 82R with the right hand. Therefore, the operator sitting on the operator's seat 6 operates the manipulation member 82 in a posture of leaning the upper part of the body forward.

The dozer lever 80 is a lever for manipulating the dozer device 7.

As illustrated in FIGS. 3 and 4, the pair of traveling pedals 85 are members that are operable for manipulating the traveling device 3 by being stepped on with the operator's feet, and are installed on the floor 5B. One of the pair of traveling pedals 85, denoted as 85L (the left one), is the pedal for manipulating the first traveling device 3L. The other traveling pedal 85R (the right one) is the pedal for manipulating the second traveling device 3R.

Figure 5:
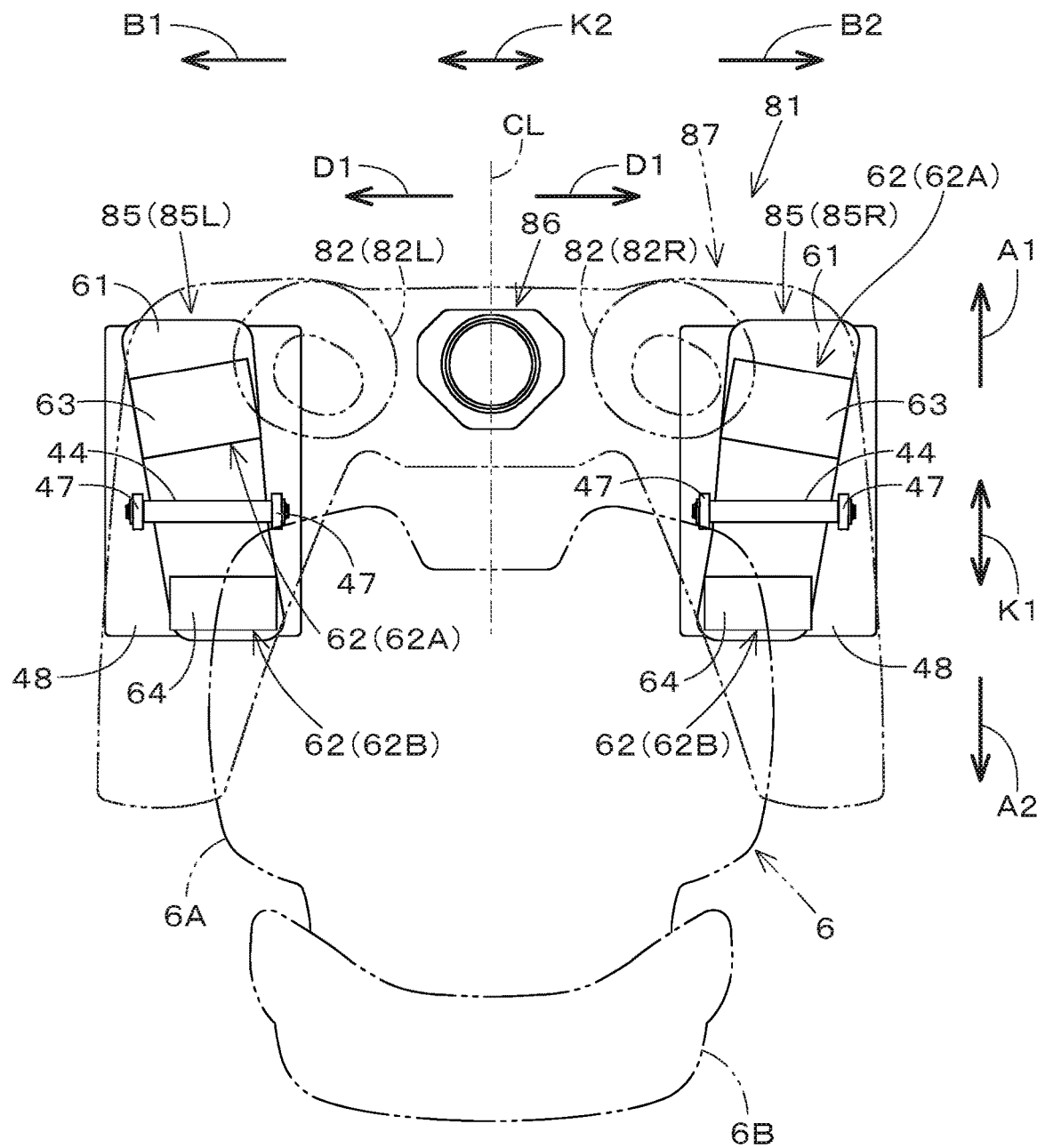
FIG. 5 is a front view of the operator's station.

As illustrated in FIG. 5, the traveling pedals 85 making up the pair are arranged ahead of the operator's seat 6 side by side with a distance therebetween in the machine-body width direction K2. More specifically, the one traveling pedal 85L is disposed ahead of the operator's seat 6 at one side (the left side) in the machine-body width direction K2, and the other traveling pedal 85R is disposed ahead of the operator's seat 6 at the other side (the right side) in the machine-body width direction K2. In other words, the one traveling pedal 85L is disposed to the left of the base column 86, and the other traveling pedal 85R is disposed to the right of the base column 86. In addition, the one traveling pedal 85L is disposed under the first armrest 93L in such a way as to overlap therewith in a plan view, and the other traveling pedal 85R is disposed under the second armrest 93R in such a way as to overlap therewith in a plan view. Therefore, when the traveling pedals 85 are operated, the left leg is present between the first armrest 93L and the one traveling pedal 85L, and the right leg is present between the second armrest 93R and the other traveling pedal 85R. Furthermore, the pair of traveling pedals 85 are disposed at positions where they are operable by the operator in a posture of leaning the upper part of the body forward and gripping the manipulation member 82, with the elbows rested on the armrests 93.

As illustrated in FIG. 5, the distance between the one traveling pedal 85L and the other traveling pedal 85R in the machine-body width direction K2 becomes greater forward gradually. That is, the distance between the pair of traveling pedals 85 becomes greater gradually toward the toes of the feet of the operator placed thereon. More specifically, the traveling pedals 85 are disposed obliquely such that, as it goes forward, the one traveling pedal 85L and the other traveling pedal 85R become more distant in a distancing direction D1, which is a direction of going away in the machine-body width direction K2, from the center CL therebetween in the machine-body width direction K2 (the center between the pedals).

The traveling pedals 85 are pedals for performing manipulation for forward traveling and rearward traveling of the working machine 1 and for steering thereof. Specifically, the working machine 1 (the machine body 2) travels forward when the operator steps on the traveling pedal 85 to press its front portion down. The working machine 1 (the machine body 2) travels rearward when the operator steps on the traveling pedal 85 to press its rear portion down. The working machine 1 (the machine body 2) travels straight when the left and right traveling pedals 85 are stepped on in the same stepping-on direction with an equal stepping-on amount. The working machine 1 (the machine body 2) makes a turn when the stepping-on amount of the one traveling pedal 85L is different from the stepping-on amount of the other traveling pedal 85R. That is, it is possible to change the number of revolutions of the first traveling motor M1 based on the stepping-on amount of the one traveling pedal 85L, and it is possible to change the number of revolutions of the second traveling motor M2 based on the stepping-on amount of the other traveling pedal 85R. The working machine 1 according to the present embodiment is designed such that, in order to ensure straightness, the operator steps on the traveling pedals 85 up to the maximum position (press the pedals all the way down) when causing it to travel straight. The operator is able to change the traveling speed by operating a shift-up/down switch provided on the manipulation member 82.

Figure 6:
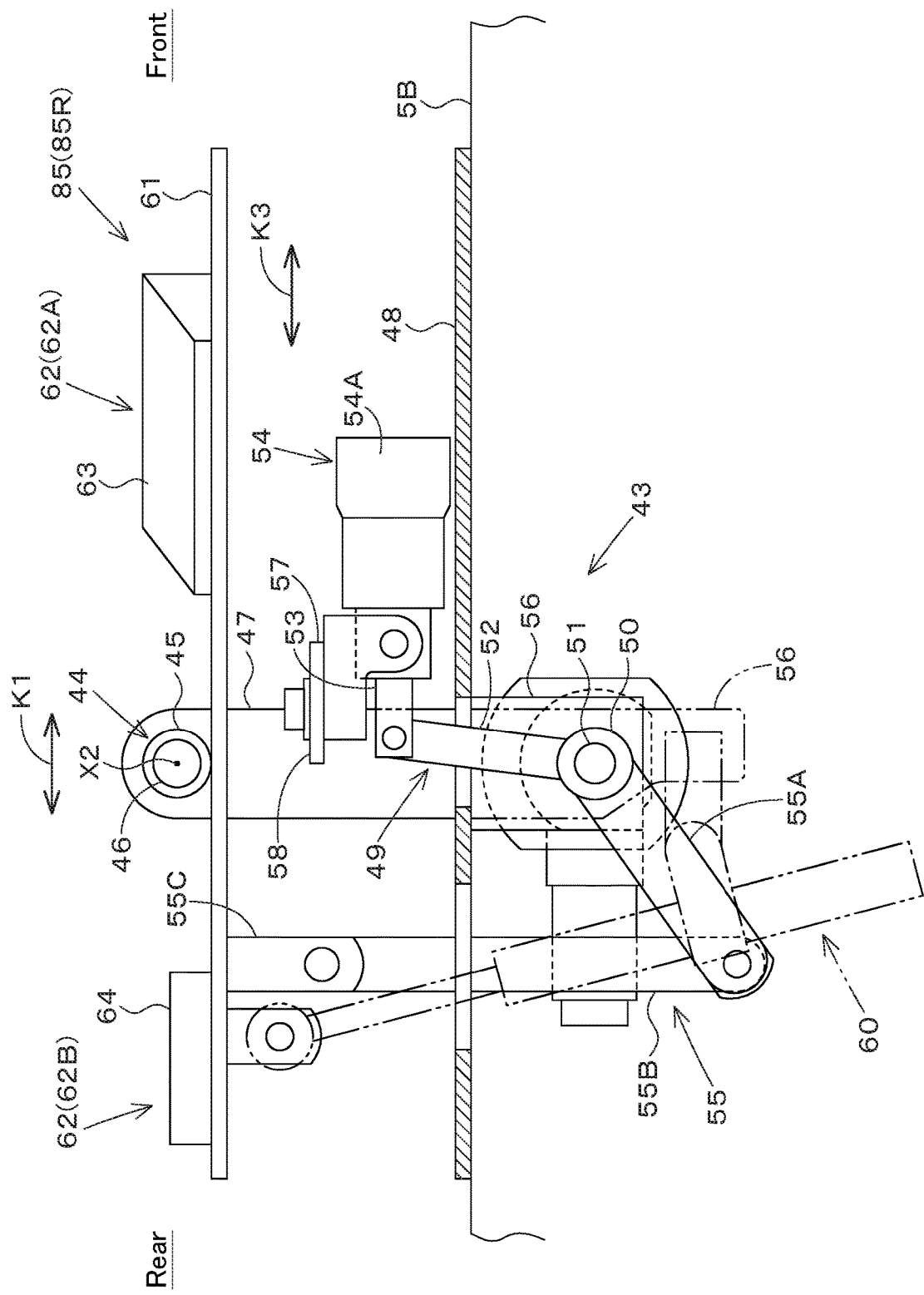
FIG. 6 is a side view of a traveling pedal and a support structure assembly.
Figure 7:
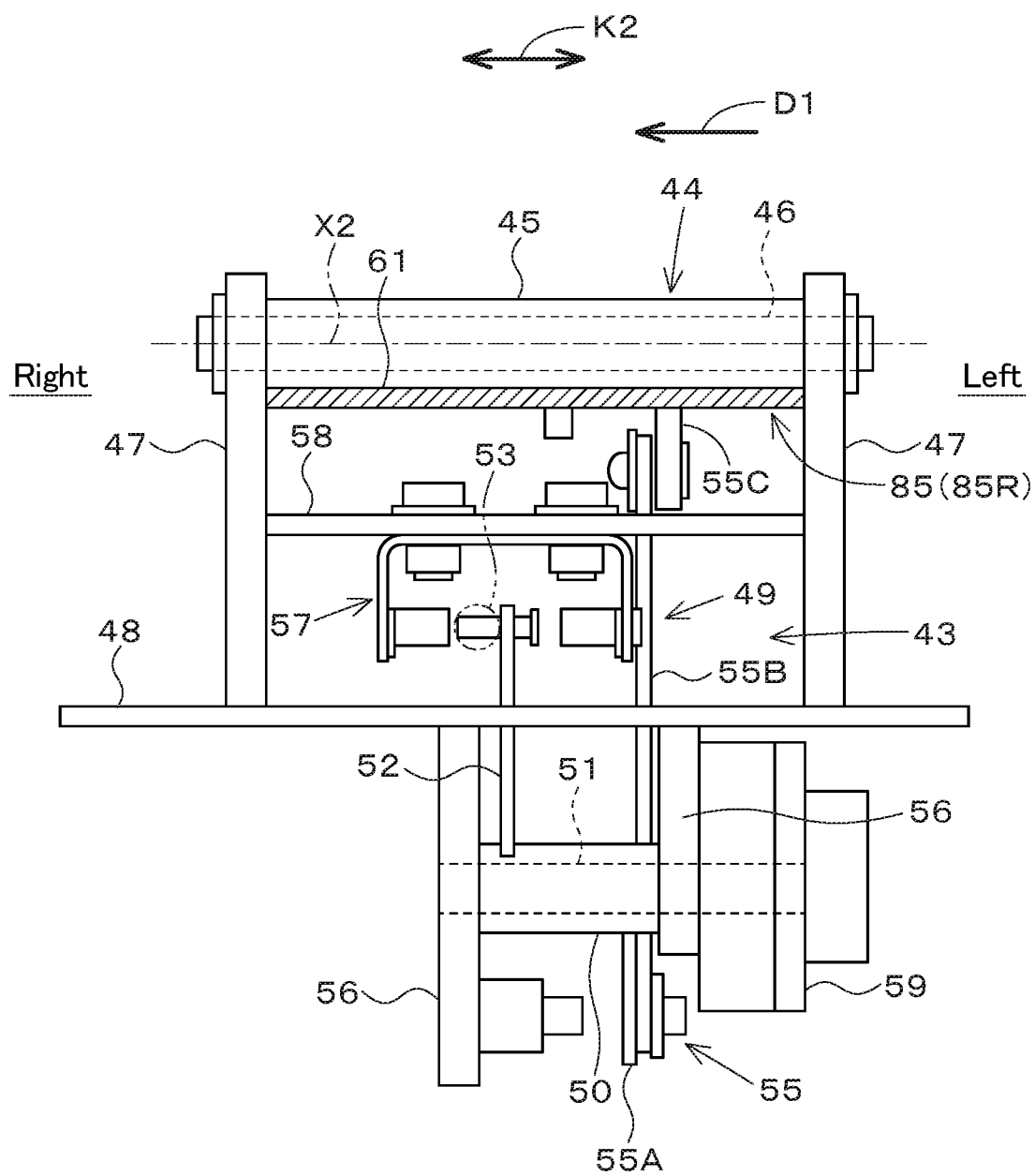
FIG. 7 is a front view of the traveling pedal and the support structure assembly.

FIG. 6 is a right side view of the other (right) traveling pedal 85R. FIG. 7 is a front view of the other traveling pedal 85R.

As illustrated in FIGS. 6 and 7, each of the traveling pedals 85 is supported over the floor 5B by a support structure assembly 43. The structure of the support structure assembly 43 supporting the one traveling pedal 85L is the same as the structure of the support structure assembly 43 supporting the other traveling pedal 85R. Therefore, the support structure assembly 43 supporting the other traveling pedal 85R will be described as a representative example, and an explanation of the support structure assembly 43 supporting the one traveling pedal 85L will be omitted.

The support structure assembly 43 includes a pedal shaft 44 supporting the traveling pedal 85. The traveling pedal 85 is supported by the pedal shaft 44 pivotally for front and rear seesaw motion. The pedal shaft 44 is disposed on the upper surface of the traveling pedal 85. The pedal shaft 44 is disposed at an intermediate position of the traveling pedal 85 in the front-rear direction. More specifically, the pedal shaft 44 is disposed behind the center of the traveling pedal 85 in the front-rear direction. In addition, the pedal shaft 44 is disposed in such a way as to extend in the machine-body width direction K2.

The pedal shaft 44 includes a rotary shaft 45, which has a cylindrical sleeve shape and is fixed to the traveling pedal 85, and a support spindle 46, which is inserted through the rotary shaft 45. The rotary shaft 45 and the support spindle 46 have an axis (rotational axial center) X2, which extends in the machine-body width direction K2. The rotary shaft 45 is supported in such a way as to be able to rotate around the axis with respect to the support spindle 46. That is, the traveling pedal 85 is configured to pivot on the rotational axial center X2 extending in the machine-body width direction K2 for front and rear seesaw motion.

The support spindle 46 is fixed between left and right pedal brackets 47 making up a pair. The left and right pedal brackets 47 are provided in such a way as to rise from a base plate 48 mounted on the floor 5B. One of the pedal brackets 47 is disposed to the left of the pedal shaft 44 and the traveling pedal 85. The other pedal bracket 47 is disposed to the right of the pedal shaft 44 and the traveling pedal 85. Therefore, the traveling pedal 85 is supported by the pedal shaft 44 and the pair of pedal brackets 47 over the floor 5B (the base plate 48) in such a way as to be able to pivot for front and rear seesaw motion.

The support structure assembly 43 includes a return-to-neutral mechanism 49 configured to return the traveling pedal 85 to its neutral position from its stepped-on position, which is a front-pressed-down or rear-pressed-down position with respect to the neutral position. The return-to-neutral mechanism 49 includes a rotary cylinder 50, a rotary shaft 51, an arm member 52, an interlocking shaft 53, a returning spring device 54, and a transmission link 55. The rotary cylinder 50 is fitted on the outer surface of the rotary shaft 51 in such a way as to be able to rotate together therewith around a horizontal axis extending in the machine-body width direction K2. The rotary shaft 51 is supported between left and right bracket members 56 making up a pair and provided on the lower surface of the base plate 48 with a distance therebetween in the machine-body width direction K2 in such a way as to be able to rotate around the horizontal axis extending in the machine-body width direction K2. The arm member 52 is fixed to the rotary cylinder 50 in such a way as to project upward. One end of the interlocking shaft 53 is pivotally coupled to the top portion of the arm member 52. The other end of the interlocking shaft 53 is housed in a housing 54A of the returning spring device 54 in such a way as to make it movable in the front-rear direction (in such a way as to enable it to advance and retract). The returning spring device 54 includes a returning spring (not illustrated) configured to return the interlocking shaft 53 to its default position corresponding to the neutral position of the traveling pedal 85. The returning spring is housed in the housing 54A. The housing 54A is disposed over the base plate 48 and is pivotally supported by a bracket member 57. The bracket member 57 is mounted on a fixing plate 58 fixed between the pair of pedal brackets 47. The transmission link 55 includes a first link 55A, one end of which is fixed to the rotary cylinder 50, a second link 55B, one end of which is pivotally coupled to the other end of the first link 55A, and a third link 55C, one end of which is pivotally coupled to the other end of the second link 55B and the other end of which is fixed to the lower surface of the traveling pedal 85.

In the return-to-neutral mechanism 49 having the structure described above, when the operator steps on the traveling pedal 85 to press its front portion down from the neutral position, the second link 55B is pulled upward, and the first link 55A, the rotary cylinder 50, and the arm member 52 rotate together to push the interlocking shaft 53 forward into the housing 54A. As a result, the returning spring inside the housing 54A gets compressed. When the operator releases the foot pressure applied to the traveling pedal 85, the traveling pedal 85 returns to its neutral position due to the resilience of the returning spring. When the operator steps on the traveling pedal 85 to press its rear portion down from the neutral position, the second link 55B is pushed downward, and the first link 55A, the rotary cylinder 50, and the arm member 52 rotate together to pull the interlocking shaft 53 rearward out of the housing 54A. As a result, the returning spring inside the housing 54A gets compressed. When the operator releases the foot pressure applied to the traveling pedal 85, the traveling pedal 85 returns to its neutral position due to the resilience of the returning spring.

The stepping-on amount and stepping-on direction of the traveling pedal 85 is detected by an angular sensor 59. The angular sensor 59 is, for example, a potentiometer. The angular sensor 59 detects the stepping-on amount and stepping-on direction of the traveling pedal 85 by detecting the rotation angle and rotation direction of the rotary shaft 51. A detection signal outputted from the angular sensor 59 is sent to a controller. Based on detection signals outputted from the angular sensors 59, the controller controls control valves for controlling the first traveling motor M1 and the second traveling motor M2.

The rear portion of the traveling pedal 85 is supported by a damper 60 so as to give a natural pedal operation feeling to the operator.

Figure 8:
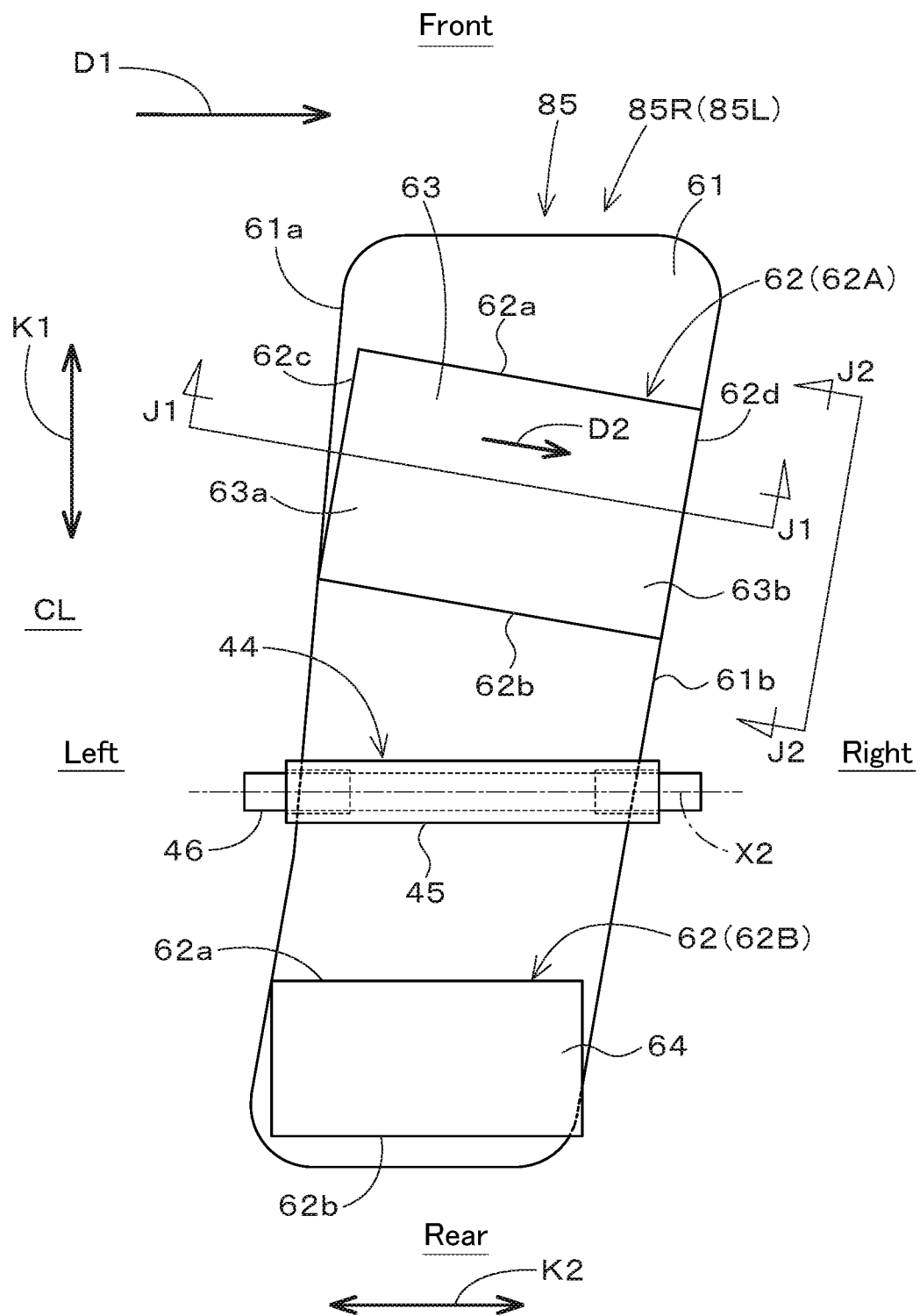
FIG. 8 is a plan view of the traveling pedal.
Figure 9:
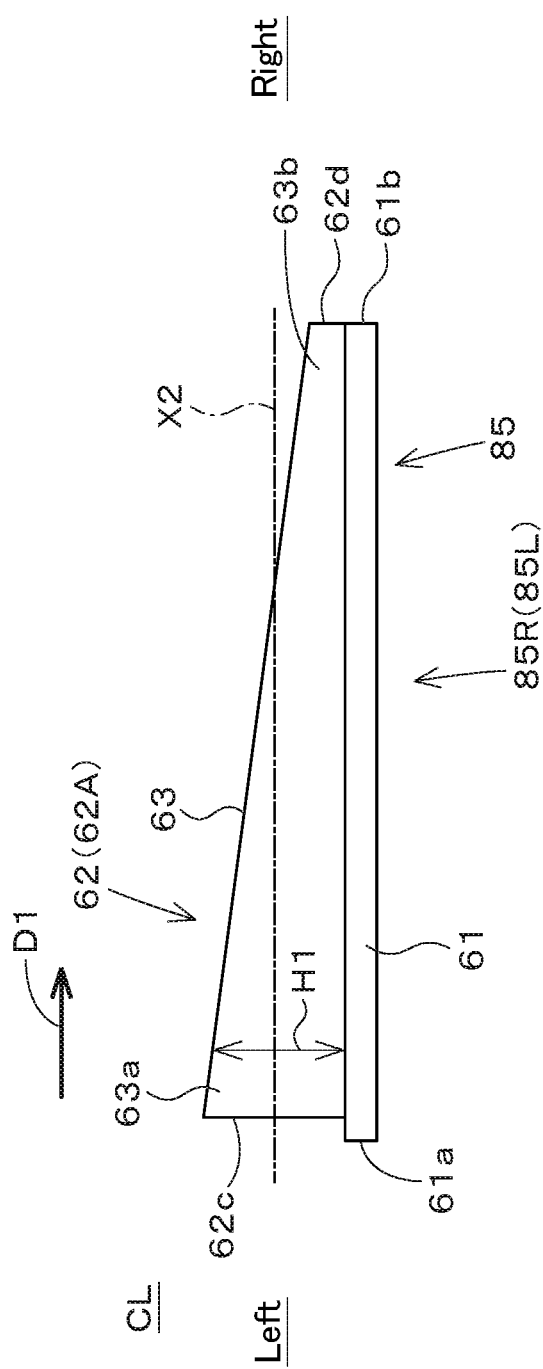
FIG. 9 is a cross-sectional view taken along the line J1-J1 of FIG. 8.

FIG. 8 is a plan view of the other traveling pedal 85R. FIG. 9 is a cross-sectional view taken along the line J1-J1 of FIG. 8. FIG. 10 is a view taken along the line J2-J2 of FIG. 8.

As illustrated in FIGS. 6 and 8, the traveling pedal 85 includes a pedal body 61 and a tread member 62, which is fixed to the upper surface of the pedal body 61. The pedal body 61 is made of a flat plate material. As illustrated in FIG. 6, the pedal body 61 extends in a predetermined direction K3, and the pedal shaft 44 supports the pedal body 61 in such a way as to allow its pivotal motion in the predetermined direction K3. In the present embodiment, the pedal body 61 extends in the front-rear direction K1. The upper surface of the pedal body 61 is a planar surface that is substantially in parallel with a plane going through the pedal shaft 44 and being in parallel with the direction in which the pedal body 61 extends (the predetermined direction K3). The rotary shaft 45 of the pedal shaft 44 is fixed to the upper surface of the pedal body 61.

The tread member 62 is a member on which the operator places the foot. That is, the tread member 62 is a member to be stepped on by the operator. In the present embodiment, the tread member 62 includes a first tread member 62A, which is provided in front of the pedal shaft 44 on the upper surface of the pedal body 61, and a second tread member 62B, which is provided behind the pedal shaft 44 on the upper surface of the pedal body 61. The tread member 62 (the first tread member 62A, the second tread member 62B) is made of a block member that has a rectangular shape in a plan view. The first tread member 62A is provided throughout a front region in the width direction (the machine-body width direction K2) on the upper surface of the pedal body 61.

The upper surface of the first tread member 62A is a tread surface 63 to be stepped on by the operator. In other words, the traveling pedal 85 includes the first tread member 62A (the tread member 62) provided closer to the toes of the operator's foot placed thereon than the pedal shaft 44 on the upper surface of the pedal body 61, and the tread surface 63 is formed as the upper surface of the tread member 62.

As illustrated in FIGS. 9 and 10, the tread surface 63 is sloped such that a height H1 from the upper surface of the pedal body 61 decreases gradually as it goes in the distancing direction D1. Specifically, the tread surface 63 of the first tread member 62A of the other traveling pedal 85R has a greater height at its left side (the side closer to the center CL between the pedals) and has a less height at its right side. The tread surface 63 of the first tread member 62A of the one traveling pedal 85L has a greater height at its right side (the side closer to the center CL between the pedals) and has a less height at its left side. Therefore, the portion having a greater height (the greater-height portion) 63a of the tread surface 63 of the first tread member 62A is the portion closer to the big toe of the foot placed on the tread surface 63, and the portion having a less height (the less-height portion) 63b of the tread surface 63 of the first tread member 62A is the portion closer to the little toe of the foot placed on the tread surface 63 (see FIG. 5).

Therefore, as illustrated in FIGS. 6 and 9, the tread surface 63 is sloped such that the height H1 from the upper surface of the pedal body 61 (reference plane) decreases gradually from the portion 63a closer to the big toe of the operator's foot placed thereon toward the portion 63b closer to the little toe.

As illustrated in FIG. 9, the tread surface 63 is inclined with respect to the axis (rotational axial center) X2 of the pedal shaft 44. The greater-height portion 63a of the first tread member 62A is located above the rotational axial center X2. The less-height portion 63b of the first tread member 62A is located below the rotational axial center X2.

As illustrated in FIG. 8, the first tread member 62A is skewed in an oblique orientation (oblique direction) D2 such that it goes rearward as it goes in the distancing direction D1 in a plan view. In other words, going from the portion closer to the big toe of the operator's foot placed thereon toward the portion closer to the little toe, the tread member 62 is skewed in an orientation of coming closer to the pedal shaft 44 in a plan view. More specifically, the front surface 62a of the first tread member 62A extends obliquely in the direction D2 to go rearward as it goes in the distancing direction D1, and the rear surface 62b of the first tread member 62A also extends obliquely in the direction D2 to go rearward as it goes in the distancing direction D1. Therefore, the first tread member 62A is skewed with respect to the machine-body width direction K2 and is skewed with respect to the axis X2 of the pedal shaft 44. In the present embodiment, the tread surface 63 (the first tread member 62A) is sloped such that the height H1 decreases gradually as it goes in the oblique direction D2.

A lateral surface 62c of the first tread member 62A, which is the surface closer to the center CL between the pedals, is inclined with respect to a lateral edge 61a of the pedal body 61, which is the edge closer to the center CL between the pedals. The opposite lateral surface 62d of the first tread member 62A, which is the opposite of the lateral surface 62c, is in line with the opposite lateral edge 61b of the pedal body 61, which is the opposite of the lateral edge 61a.

As illustrated in FIGS. 6 and 8, the second tread member 62B has a rectangular shape in a plan view and is disposed such that its front surface 62a and rear surface 62b are parallel to the axis of the pedal shaft 44. A tread surface (another tread surface) 64, which is the upper surface of the second tread member 62B, is a flat surface that is parallel to the rotational axial center X2. The tread surface 64 of the second tread member 62B corresponds to the heel of the operator's foot placed on the traveling pedal 85. That is, the second tread member 62B is stepped on by the operator with the heel.

In the present embodiment, the entire region of the tread surface 63 formed on the first tread member 62A is sloped; however, the scope of the disclosure is not limited thereto. For example, the slope may be formed at the front portion only of the tread surface 63. The first tread member 62A and the second tread member 62B may be formed integrally. The second tread member 62B may also have a sloped structure such that the height H1 from the pedal body 61 decreases gradually as it goes in the distancing direction D1, as is the case with the first tread member 62A. In the illustrated example, the traveling pedal 85 is horizontal at its neutral position; however, the scope of the disclosure is not limited thereto. For example, the traveling pedal 85 may be inclined forward or inclined rearward at its neutral position.

The traveling pedal 85 having the structure described above enables the operator to perform pedal operation by stepping on (pressing down) its tread surface with the big toe of the foot, with the knees together, at the time of forward traveling, that is, when applying foot pressure to the traveling pedal 85 to press its front portion down. Moreover, the operator is able to perform pedal operation by stepping on (pressing down) the tread surface with the heel, with the knees apart, at the time of rearward traveling, that is, when applying foot pressure to the traveling pedal 85 to press its rear portion down.

In the present embodiment, it has been described that the upper surface of the pedal body 61 is a planar surface that is in parallel with a plane going through the pedal shaft 44 and being in parallel with the direction in which the pedal body 61 extends (the predetermined direction K3); however, the scope of the disclosure is not limited thereto. For example, the upper surface of the pedal body 61 may have irregularities and/or a sloped shape. In such a case, the following structure suffices: a plane going through the portion, of the pedal body 61, supported by the pedal shaft 44 and being in parallel with the direction in which the pedal shaft 44 extends and the direction in which the pedal body 61 extends (the predetermined direction K3) is taken as the reference plane of the pedal body 61, and the tread surface 63 is sloped such that the height from the pedal body 61 (the reference plane of the pedal body 61) decreases gradually from the portion 63a closer to the big toe of the operator's foot placed thereon toward the portion 63b closer to the little toe.

In the present embodiment, it has been described that the pedal shaft 44 is fixed to the upper surface of the pedal body 61; however, the scope of the disclosure is not limited thereto. For example, the pedal shaft 44 may be fixed to the lower surface of the pedal body 61.

In the present embodiment, an example of a case where the present invention is applied to each of the pair of traveling pedals 85 has been described; however, the scope of the disclosure is not limited thereto. The present invention may be applied to either one only of the pedal provided for the left foot and the pedal provided for the right foot. The target of application is not limited to the traveling pedal(s) 85 for manipulating the traveling device 3. For example, the present invention may be applied to a pedal for manipulating equipment other than the traveling device 3 such as the swing cylinder C2, the boom cylinder C3, the arm cylinder C4, the bucket cylinder C5, a dozer cylinder, or various kinds of equipment attached to the working machine 1.

In the present embodiment, an example of a case where the present invention is applied to a backhoe whose pedal operation is performed by the operator in a posture of leaning the upper part of the body forward and gripping the manipulation member 82, with the elbows rested on the armrests 93, has been described; however, the scope of the disclosure is not limited thereto. For example, it may be configured such that the operator performs pedal operation in a posture of leaning on the backrest portion 6B of the operator's seat 6. The present invention may be applied also to various working machines other than a backhoe.

The above structure makes it possible to perform smooth pedal operation. Moreover, it is possible to perform fine operation easier.

The working machine 1 described above includes: the operator's seat 6; and the at least one pedal 85 to be operated by being stepped on with a foot, the at least one pedal 85 being disposed ahead of the operator's seat 6; wherein the at least one pedal 85 includes the pedal body 61 extending in the predetermined direction K3, the pedal shaft 44 supporting the pedal body 61 in such a way as to allow pivotal motion thereof in the predetermined direction K3, and the tread surface 63 provided on an upper surface of the pedal body 61 and being a surface on which an operator places the foot, and the tread surface 63 is sloped such that the height H1 from the pedal body 61 decreases gradually from a portion closer to a big toe of the foot of the operator placed thereon (the greater-height portion 63a) toward a portion closer to a little toe (the less-height portion 63b).

This structure enables the operator to operate the pedal by stepping thereon with the ball of the big toe of the foot, with the knees together, resulting in smooth pedal operation.

The pedal shaft 44 is disposed at an intermediate position of the at least one pedal 85 in the front-rear direction K1, supports the pedal body 61 in such a way as to allow front and rear seesaw motion thereof, and extends in the machine-body width direction K2.

This structure also makes it possible to operate the traveling pedal 85 smoothly.

The at least one pedal 85 includes the tread member 62 provided closer to toes of the foot of the operator placed thereon than the pedal shaft 44 on the upper surface of the pedal body 61, and the tread surface 63 is formed as an upper surface of the tread member 62.

This structure makes it possible to form the sloped tread surface 63 easily.

The working machine 1 includes, as the at least one pedal 85, a pair of pedals 85 arranged at a distance from each other.

This structure makes it possible to perform pedal operation of the working machine 1 equipped with the pair of pedals smoothly.

The distance between the pair of pedals 85 becomes greater gradually toward the toes of the feet of the operator placed thereon.

This structure enables the operator to place the feet on the pair of pedals 85 comfortably.

Going from the portion closer to the big toe of the foot of the operator placed thereon (the greater-height portion 63a) toward the portion closer to the little toe (the less-height portion 63b), the tread member 62 may be skewed in the orientation D2 of coming closer to the pedal shaft 44 in a plan view.

The working machine 1 further includes the traveling device 3, wherein the at least one pedal 85 is at least one traveling pedal for manipulating the traveling device 3.

This structure makes it possible to operate the at least one traveling pedal smoothly.

The upper surface of the pedal body 61 is a planar surface that is in parallel with the direction K3 in which the pedal body 61 extends, and the tread surface 63 is sloped such that the height from the upper surface of the pedal body 61 decreases gradually from the portion closer to the big toe of the foot of the operator placed thereon (the greater-height portion 63a) toward the portion closer to the little toe (the less-height portion 63b).

This structure also makes it possible to perform smooth pedal operation.

The working machine 1 further includes: the manipulator base 81 disposed in front of the operator's seat 6; the manipulation member 82 to be gripped and operated, the manipulation member 82 being provided on the manipulator base 81; and the armrest 93 extending rearward from the manipulator base 81, wherein the at least one pedal 85 is disposed at a position where the at least one pedal 85 is operable by the operator in a posture of leaning an upper part of a body forward and gripping the manipulation member 82, with an elbow rested on the armrest 93.

The present embodiment makes it possible to enhance the operability of the at least one pedal 85 operated in a posture of leaning the upper part of the body forward and gripping the manipulation member 82, with the elbow rested on the armrest 93.

While preferred embodiments of the present invention have been described above, it shall be construed that the embodiments disclosed herein are just illustrative in every aspect and not restrictive, and it is to be understood that variations and modifications will be apparent to those skilled in the art without departing from the scope and spirit of the present invention. All modifications made within the scope of the claims and its equivalents are intended to be encompassed herein. The scope of the present invention, therefore, is to be determined solely by the following claims.

What is claimed is:

1. A working machine, comprising:
   an operator's seat; and
   at least one pedal to be operated by being stepped on with a foot, or with feet, the at least one pedal being disposed ahead of the operator's seat, wherein
   the at least one pedal includes a pedal body extending in a predetermined direction, a pedal shaft having an axis intersecting the predetermined direction and supporting the pedal body in such a way as to allow pivotal motion of the pedal body around the axis, and a tread surface provided on an upper surface of the pedal body and being a surface on which an operator places the foot, and the tread surface is sloped such that a height from the pedal body decreases gradually from a portion closer to a big toe of the foot of the operator placed thereon toward a portion closer to a little toe.

2. The working machine according to claim 1, wherein the pedal shaft extends in a machine-body width direction, is disposed at an intermediate position in the direction in which the pedal body extends, and supports the pedal body in such a way as to allow the pivotal motion of the pedal body.

3. The working machine according to claim 2, wherein the at least one pedal includes a tread member provided closer to toes of the foot of the operator placed thereon than the pedal shaft on the upper surface of the pedal body, and the tread surface is formed as an upper surface of the tread member.

4. The working machine according to claim 1, comprising:

as the at least one pedal, a pair of pedals arranged at a distance from each other.

5. The working machine according to claim 4, wherein the distance between the pair of pedals becomes greater gradually toward the toes of the feet of the operator placed thereon.

6. The working machine according to claim 3, wherein going from the portion closer to the big toe of the foot of the operator placed thereon toward the portion closer to the little toe, the tread member is skewed in an orientation of coming closer to the pedal shaft in a plan view.

7. The working machine according to claim 1, further comprising:

a traveling device, wherein the at least one pedal is at least one traveling pedal for manipulating the traveling device.

8. The working machine according to claim 1, wherein the upper surface of the pedal body is a planar surface that is in parallel with the direction in which the pedal body extends, and the tread surface is sloped such that the height from the upper surface of the pedal body decreases gradually from the portion closer to the big toe of the foot of the operator placed thereon toward the portion closer to the little toe.

9. The working machine according to claim 1, further comprising:

a manipulator base disposed in front of the operator's seat;

a manipulation member to be gripped and operated, the manipulation member being provided on the manipulator base; and an armrest extending rearward from the manipulator base, wherein the at least one pedal is disposed at a position where the at least one pedal is operable by the operator in a posture of leaning an upper part of a body forward and gripping the manipulation member, with an elbow rested on the armrest.

* * * * *